United States Patent [19]

Grossman

[11] Patent Number: 5,012,106
[45] Date of Patent: Apr. 30, 1991

[54] AXI-SYMMETRICAL FLOW REACTOR FOR $^{196}$HG PHOTOCHEMICAL ENRICHMENT

[75] Inventor: Mark W. Grossman, Belmont, Mass.
[73] Assignee: GTE Products Corporation, Danvers, Mass.
[21] Appl. No.: 289,639
[22] Filed: Dec. 23, 1988
[51] Int. Cl.$^5$ ............................................. B01D 59/00
[52] U.S. Cl. ................... 250/438; 250/436; 250/435; 250/432 R; 204/157.21
[58] Field of Search ........... 250/438, 436, 435, 432 R; 204/157.2, 157.21

[56] References Cited

U.S. PATENT DOCUMENTS

| | | | |
|---|---|---|---|
| 3,897,331 | 7/1975 | Smith et al. | 209/10 |
| 3,983,019 | 9/1976 | Botter | 204/157 R |
| 4,379,252 | 4/1983 | Work | 313/485 |
| 4,514,363 | 4/1985 | Durbin | 423/3 |
| 4,527,086 | 7/1985 | Maya | 313/485 |
| 4,676,956 | 6/1987 | Mori | 250/435 |
| 4,678,550 | 7/1987 | Grossman | 204/105 R |
| 4,713,547 | 12/1987 | Grossman | 250/373 |
| 4,789,784 | 12/1988 | Grossman et al. | 250/436 |
| 4,879,010 | 11/1989 | Grossman et al. | 204/105 R |

FOREIGN PATENT DOCUMENTS 280788 12/1987 European Pat. Off. .
281687 12/1987 European Pat. Off. .

OTHER PUBLICATIONS

Waymouth, Electric Discharge Lamps, MIT Press (1971).
Webster and Zare, J. Phys. Chem. 85: 1302–1305 (1981).
Maya et al., Science, 26:435–436 (1984).

Primary Examiner—Jack I. Berman
Attorney, Agent, or Firm—Ernest V. Linek

[57] ABSTRACT

The present invention is directed to an improved photochemical reactor useful for the isotopic enrichment of a predetermined isotope of mercury, especially, $^{196}$Hg. Specifically, two axi-symmetrical flow reactors were constructed according to the teachings of the present invention. These reactors improve the mixing of the reactants during the photochemical enrichment process, affording higher yields of the desired $^{196}$Hg product. Measurements of the variation of yield (Y) and enrichment factor (E) along the flow axis of these reactors indicates very substantial improvement in process uniformity compared to previously used photochemical reactor systems. In one preferred embodiment of the present invention, the photoreactor system was built such that the reactor chamber was removable from the system without disturbing the location of either the photochemical lamp or the filter employed therewith.

9 Claims, 4 Drawing Sheets

AXI-SYMMETRICAL FLOW REACTOR FOR $^{196}$HG PHOTOCHEMICAL ENRICHMENT

STATEMENT OF GOVERNMENT INTEREST

The Government of the United States of America has rights in this invention pursuant to Subcontract 4540710 under Prime Contract DE-AC03-76SF00098 awarded by the Department of Energy.

FIELD OF THE INVENTION

The present invention is directed to a method and apparatus useful in the isotopic enrichment of a predetermined isotope of mercury (Hg) from a naturally occurring mercury mixture. While the present invention may be used in the enrichment of any one of the seven naturally occurring isotopes of mercury ($^{202}$Hg, $^{200}$Hg, $^{199}$Hg, $^{201}$Hg, $^{198}$Hg, $^{204}$Hg, and $^{196}$Hg,) it has particularly advantageous application natural abundance of only about 0.146 percent.

BACKGROUND OF THE INVENTION

Many devices utilize mercury in their operation, particularly in the field of electric lamps and lighting. Such devices include arc discharge lamps which typically employ mercury as one of the vaporizable components therein. See, for example, Waymouth, *Electric Discharge Lamps*, MIT Press 1971 for a description of the basic principles of such lamps.

In U.S. Pat. No. 4,379,252, (the '252 patent), the advantages of utilizing higher than normal levels of $^{196}$Hg in the Hg added to fluorescent lamps are described and include unexpectedly high efficiency gains in light output. The disclosure of this patent is hereby incorporated herein by reference.

The drawback of using this isotope lies in its high cost. For example, using conventional enrichment techniques, mercury which has been enhanced to contain about 35% of the $^{196}$Hg isotope can cost about $500 per milligram. While only sub-milligram quantities of this isotope need be added to an incandescent lamp to afford beneficial results, economic realities always play a part in consumer products. Accordingly, it is easy to understand why more economical methods of obtaining this isotope continue to be sought.

Isotopically enriched mercury can be produced by a number of methods. One method involves photosensitized chemical reactions utilizing elemental mercury and various compounds. The compounds HCl and $O_2$ react with mercury atoms when the mercury atoms are excited by resonance radiation, in particular, 2537 Å radiation produced in a Hg ($^3$P - $^1$S$_o$) transition generating isotopically selective reactions. Thus, the Hg compound formed contains Hg enriched in a particular isotope, and the Hg must be separated from the compound into its liquid or free state (i.e., elemental Hg)) in order to recover the isotopically enriched metal.

The following documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,527,086;
Durbin, U.S. Pat. No. 4,514,363;
Work et al., U.S. Pat. No. 3,379,252;
Botter nee Bergheaud et al., U.S. Pat. No. 3,983,019;
Smith et al., U.S. Pat. No. 3,897,331;
Grossman et al., U.S. Pat. Ser .No., 815,150, filed Dec. 31, 1985, now U.S. Pat. No. 4,879,010;
European Patent Publication No. 0 281 687, published Sept. 14, 1988, claiming priority of U.S. Ser. No. 947,217, filed Dec. 29, 1986;
and
European Patent Publication No. 0 280 788, published Sept. 7, 1988, claiming priority of U.S. Ser. No. 947,216, filed Dec. 29, 1986.

SUMMARY OF THE INVENTION

The present invention is directed to an improved photochemical reactor useful for the isotopic enrichment of a predetermined isotope of mercury, especially, $^{196}$Hg.

Specifically, two axi-symmetrical flow reactors were constructed according to the teachings of the present invention. These reactors improve the mixing of the reactants during the photochemical enrichment process, affording higher yields of the desired $^{196}$Hg product.

Measurements of the variation of yield (Y) and enrichment factor (E) along the flow axis of these reactors indicates very substantial improvement in process uniformity compared to previously used photochemical reactor systems.

In one preferred embodiment of the present invention, the photoreactor system was built such that the reactor chamber was removable from the system without disturbing the location of either the photochemical lamp or the filter employed therewith.

BRIEF DESCRIPTION OF THE DRAWINGS

FIGS. 4A, 4B and 4C show an alternative embodiment of an axi-symmetrical flow reactor designed in accordance with the principles of the present invention.

DETAILED DESCRIPTION OF THE PREFERRED EMBODIMENTS

The present invention is directed to improved photoreactors useful for the isotopic enrichment of a predetermined isotope of mercury, particularly $^{196}$Hg The reactors of the present invention are axi-symmetrical with respect to the flow of the reactants versus the photochemical light source which initiates the photochemical reactions which lead to enrichment.

Figure 1:
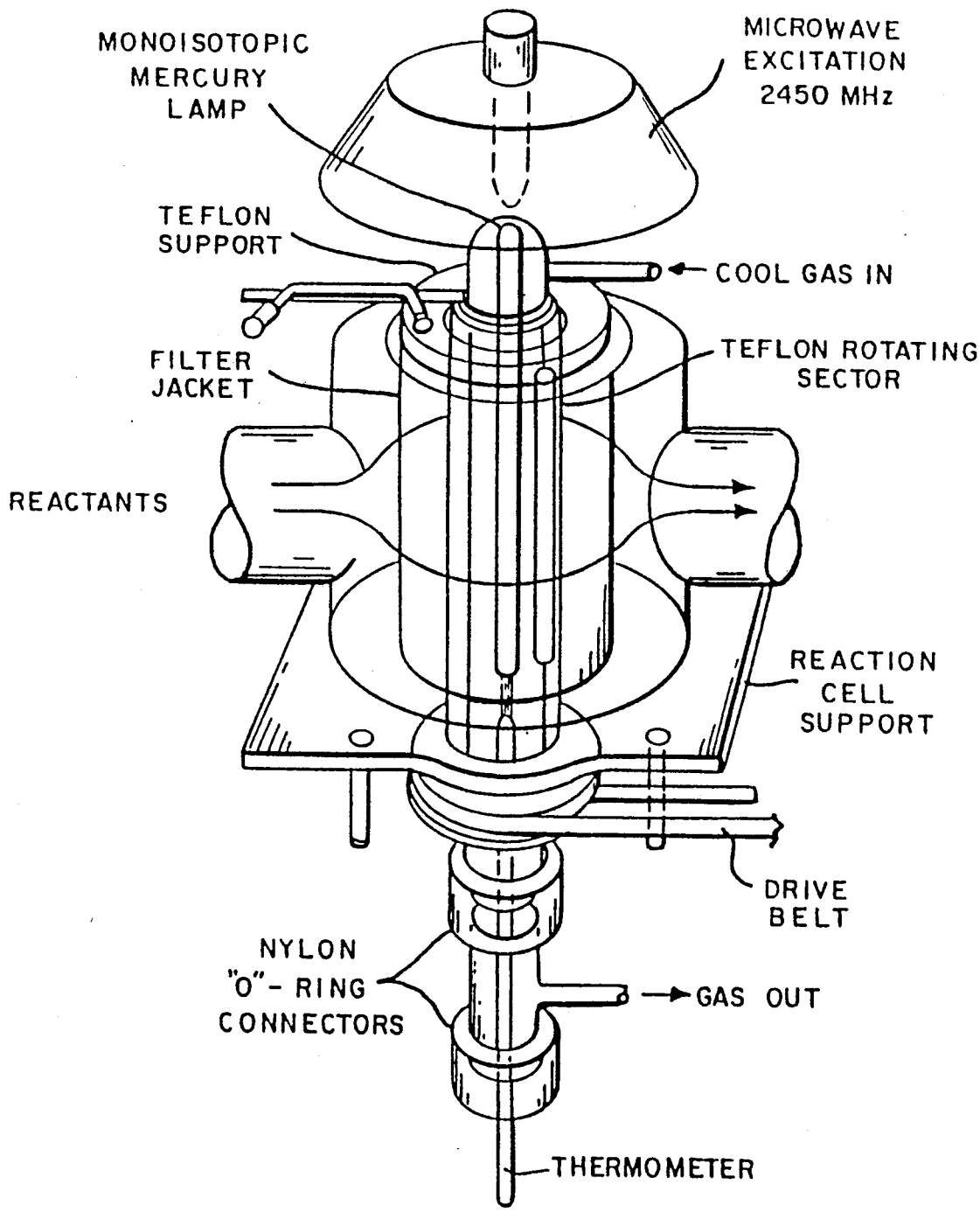
FIG. 1 illustrates the monoisotopic lamp and reaction cell of Webster and Zare from "Photochemical Isotope Separation of Hg-196 by Reaction with Hydrogen Halides," *J. Phys. Chem.*, 85: 1302–1305 (1981), the teachings of which are hereby incorporated herein by reference. The process gases flow transverse to the central axis of the annular gap.

One preferred embodiment of the present invention is an axi-symmetrical photochemical $^{196}$Hg enrichment reactor system which has a much simpler design than previously employed annular gap systems (e.g. that of FIGS. 1 or 2). In the present system, internal volume and length can be changed over a wide range, e.g., from about $1.1 \times 10^4$ to $2.5 \times 10^5$ cc and $0.3^m$ to $3.0^m$ inches, respectively. The use of removable tubes or removable groups of tubes permit faster processing rates both in photochemical deposition and in product recovery compared to traditional annular gap systems.

Figure 2A:
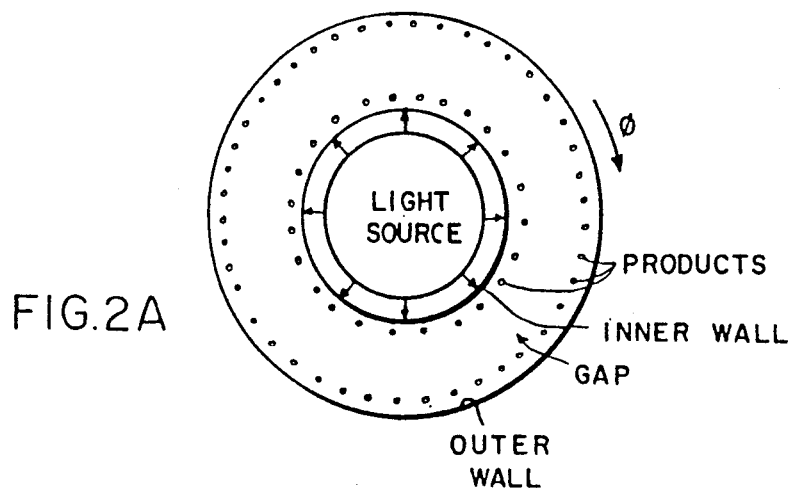
FIGS. 2A and 2B illustrate a reactor design having reactor flow parallel to the central axis of the gap wherein product is produced (the annular gap).
Figure 2B:
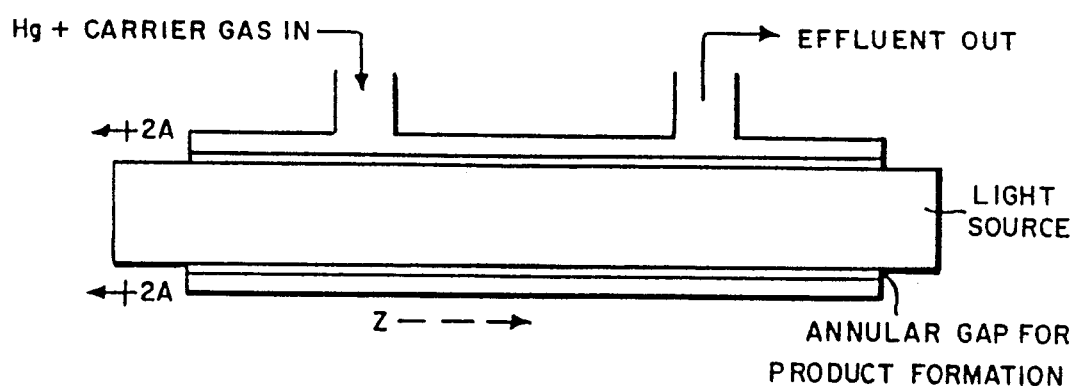

Referring to FIGS. 1, 2 and 3, three types of annular gap reactors are shown. FIGS. 2A and 2B illustrate a reactor design having reactor flow parallel to the central axis of the gap wherein product is produced (the annular gap). The reactors FIGS. 1, and 2, typically result in non-uniform product deposition and areas of very low enrichment. In addition to a large axial variation in enrichment (E), there is also a substantial variation in the azimuthal direction enrichment ($\phi$).

Figure 3A:
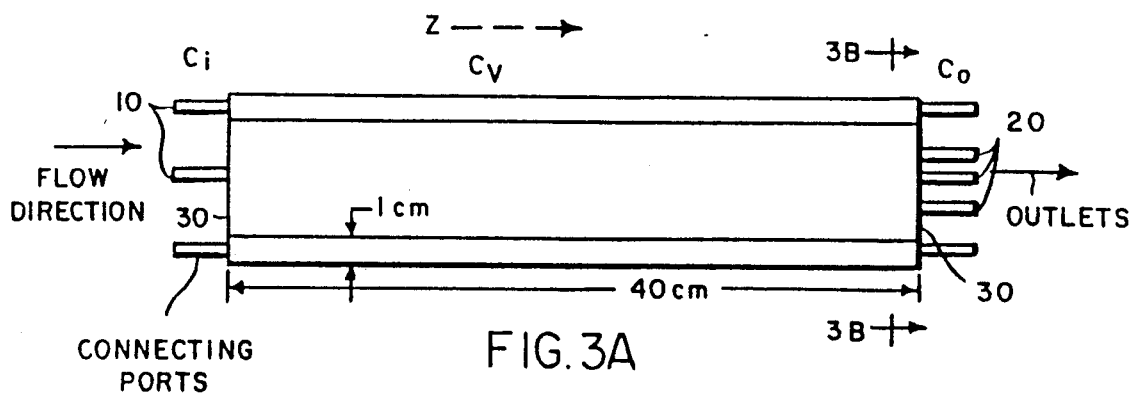
FIGS. 3A and 3B illustrate an axi-symmetrical flow reactor, designed in accordance with the principles of the present invention, namely such that it eliminates the $\phi$ variation and substantially improves the E variation seen in previous reactors such as those of FIGS. 2 and 1.
Figure 3B:
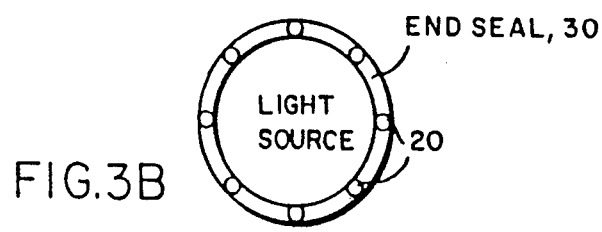

A reactor design in accordance with the principles of the present invention, and that has eliminated the $\phi$ variation and substantially improves the E variation seen previously, is shown in FIGS. 3A and 3B.

As illustrated in FIG. 3, axi-symmetrical flow is achieved in an annular gap reactor by placing entrance (10) and exit (20) ports on the annular gap seal (30). The pressure gradient along the axis is reduced by increasing the exit conductance ($C_o$) relative to the entrance conductance ($C_i$).

Table 1 and Table 2 are comparisons of the results using the two reactor designs of FIGS. 2 and 3. Segmented recovery was used to obtained the data shown in Tables 1 and 2. Segmented recovery is described in detail in the copending application of Grossman, entitled "Electrolytic Recovery of Mercury," Serial WO 07-289,850, filed on even date herewith, the teachings of which are hereby incorporated herein by reference.

TABLE 1

Typical Y and E Axial Variation for Non-Uniform Flow Conditions

| | Upsteam End | | | | |
|---|---|---|---|---|---|
| $z_{(cm)}$ | 0–8 | 8–16 | 16–24 | 24–33 | 33–41 |
| E | 1.634 | 2.068 | 1.966 | 1.025 | 0.309 |
| Y(g/hr) | 0.107 | 0.143 | 0.276 | 0.254 | 0.0705 |

TABLE 2

Typical Y and E Axial Variation for Near Uniform Flow Conditions

| $z_{cm}$ | 0–8 | 8–19 | 19–30 | 30–41 |
|---|---|---|---|---|
| E | 13.8 | 7.14 | 2.96 | 2.07 |
| Y(g/hr) | 0.025 | 0.031 | 0.071 | 0.074 |

Table 3 shows the other process parameters used.

TABLE 3

Typical Operating Conditions for High Utilization System

| Reactor Length | 40 cm |
|---|---|
| Reactor Gap | 1 cm |
| Lamp Parameters | |
| Length | 40 cm |
| Diameter | 1 cm |
| Gas Fill | 2.5T Argon |
| Current | 1.0 Amp |
| Cold Spot Temp. | 20° C. |
| Wall Temp. | 60° C. |
| $^{196}$Content | 50% |
| Filter Parameters | |
| Length | 40 cm |
| Gap | 1 cm |
| Gas Fill | 10T Hydrogen |
| Cold Spot Temp. | 40° C. |
| $^{196}$Hg Content | 0.07% (50% that of natural Hg) |
| Process Parameters | |
| Mercury Density | 25 mT |
| Q Mercury Flow Rate | 2 g/hr |
| HCl flow rate | 0.2 slm (standard liters per minute) |
| He flow rate | 0.2 slm |
| HCl pressure | 2 Torr |
| He pressure | 2 Torr |
| Total Pressure | 4 Torr |
| Y Yield | 0.4 g/hr |
| E Enrichment factor | 3 |
| U Utilization factor | 0.6 |

It is also noted in FIG. 3 that compared to the reactor of FIG. 2, additional inlet and outlet ports are provided. This reduces the outlet conductance relative to the inlet and thereby produces a more uniform pressure along the reactor. If $C_i$, $C_v$, $C_o$, and $C_vo$ are the inlet, annular volume, outlet conductance, and combined volume and outlet conductance respectively then if $C_vo < < C_o$ a large pressure gradient can exist along the annular gap. If $C_i < < C_vo$ then the pressure gradient is reduced. In a "lumped" conductance model:

$$C_vo = \frac{C_v C_o}{C_o + C_v}$$

So that for $C_o$ and $C_v$ comparable, increasing $C_o$ would achieve larger $C_vo$ and thus a more uniform increase the pressure gradient. This effect is useful when $C_v \leq C_o$, otherwise when $C_v \geq \geq C_o$, $C_vo = C_o$. In this case $C_o = C_i$ will not effect the pressure gradient in steady state conditions.

The one deficiency in the above-described embodiment rests in the inability to build such reactors on a very large scale. The construction of the annular gap seal and the availability of large diameter quartz tubing limit the ability to scale up the reactor in terms of increased length and diameter.

Figures 4A, 4B:
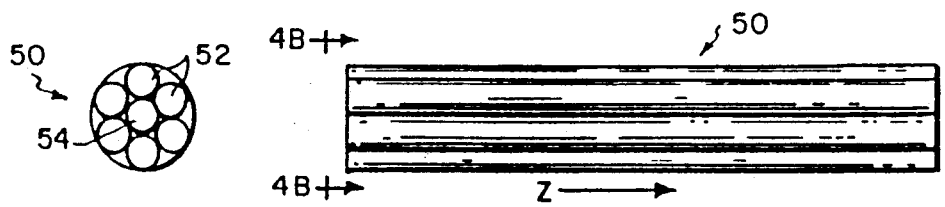

FIGS. 4A, 4B and 4C show an alternative embodiment of an axi-symmetrical flow reactor, one which overcomes the aforementioned deficiency for scale-up. In this embodiment, a multi-tube reactor (50) is illustrated which consists of a series of straight tubes 52 of radius $r_i$ arranged in a circle of radius R about the light source 54. In preferred embodiments of this type reactor, values of R=15 cm and 5 cm have been used with $r_i$=1.2 cm. The tube length is typically about 40 cm.

Product recovery consists of removing tubes from the reactor region and using well known extraction procedures, such as electrolytic recovery, to extract the product. See, for example, Grossman et al., U.S. Pat. No. 4,678,550 and Grossman et, al., U.S. Ser. No. 815,150, filed Dec. 31, 1985, now U.S. Pat. No. 4,879,010, the teachings of which are hereby incorporated herein by reference.

As described in FIGS. 4A, 4B and 4C the tube ends are connected to manifolds which distribute the gas/vapor phase reagents fairly uniformly into the individual reactor tubes. Both circular and semicircular manifolds have been constructed. The advantage of two semicircular manifolds is that groups of reactor tubes can be removed at once without moving the light source.

Figure 5:
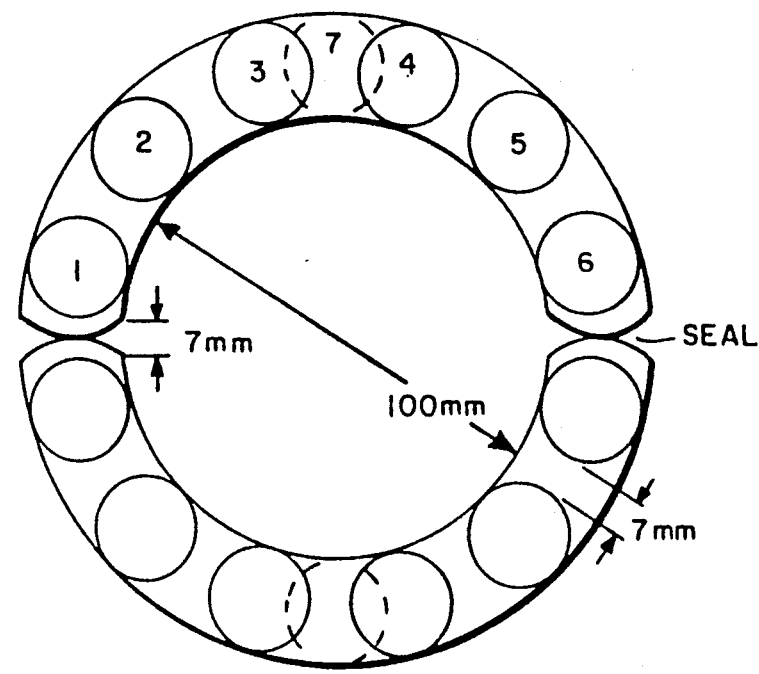
FIG. 5 illustrates semicircular manifolds in which groups of reactor tubes can be removed at once without moving the light source.

FIG. 5 is a sketch of semicircular manifolds as actually built. In contrast to this embodiment, it would be extremely difficult to construct an annular gap reactor which was split along its longitudinal axis.

Scaling up of the reactor system can be achieved by increasing the length of the tubes L and increasing the radius R of each, and by using a larger number of tubes (N). An annular gap system with R much greater than 50 cm or with a length much greater than 150 cm is substantially more difficult to construct.

In order to increase the surface onto which product produced in a $^{196}$Hg is deposited, small quartz tubes 5 mm ID, 7 mm OD have been used within the reactor volume. A comparison of one type of reactor with and without these internal tubes indicates an improved process using internal tubes.

Transmission probe measurements indicate that during a photochemical $^{196}$Hg enrichment process lo transmitted U.V. radiation into the reaction zone decreases due to product formation. It is this effect which is believed responsible for the fall off in feedstock utilization as function of time.

Observations indicate that product forms preferentially, under many reactor operating conditions, on the reactor wall closest to the incoming U.V. radiation. If this area or window is small the radiation fall off is more severe than if it is large due to the fact that the transmitted intensity I is given by:

$$I = I_0 \exp{-Sa}$$

where
S = product thickness on window
A = transmission factor
$I_0$ = transmission for S = 0

As the window area decreases S must increase if the amount of product is constant. Thus I is smaller for smaller windows and fixed product yields. It is noted that the decrement in I is exponential with increasing S.

In order to lessen the decrease in I versus product yield methods of increasing the deposition area have been considered. One technique that has yielded improved processing is to place straight quartz tubes into the reactor volume.

Both annular gap and multi-tube axi-symmetrical reactor systems benefit from the use of these internal tubes.

Figure 4B:
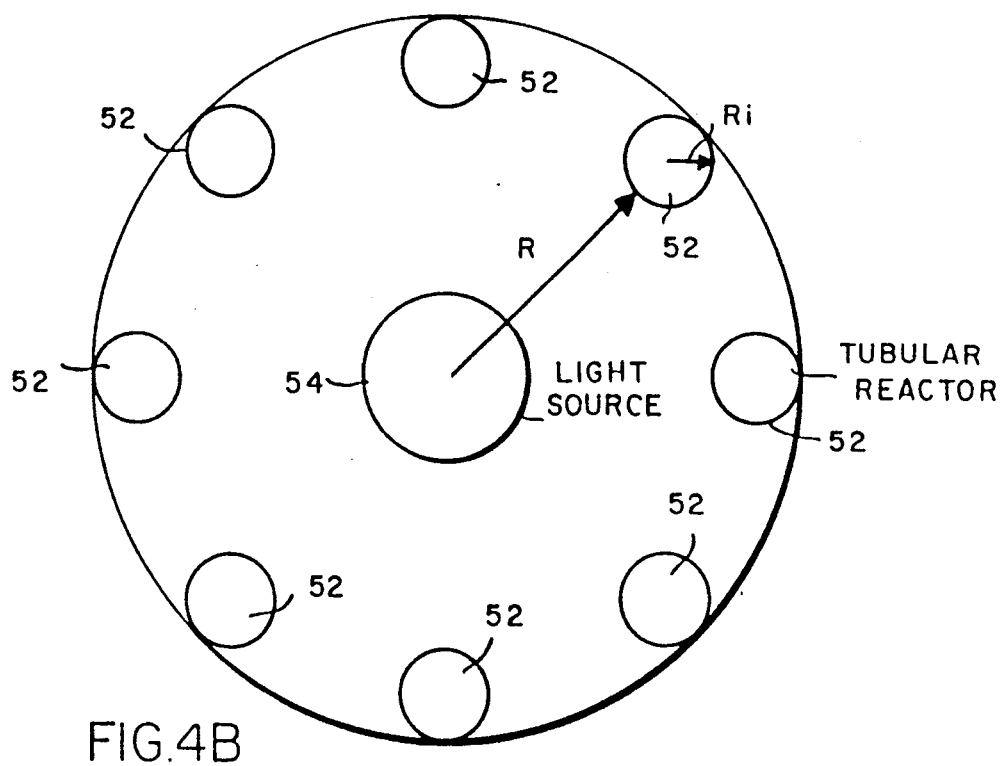

FIG. 4 represents a system with 8, $r_i = 1.1$ cm straight reactor tubes placed on the circumference of R = 5 cm radius circle. Two sets of runs were carried out one with inner tubes one without. The results are summarized in Table 4. Note the enrichment factor E and the average (QU + YE/2) are consistently higher for the internal tube condition than no internal tube.

TABLE 4

| | | Internal Tubes vs. No Internal Tubes | | | | | | |
|---|---|---|---|---|---|---|---|---|
| RUN ID | $T_B$ | INTERNAL TUBES | Q | U | Y | E | QU | YE | $\frac{QU + YE}{2}$ |
| 1 | 72 | Y | 9.31 | 0.0905 | 0.294 | 2.22 | 0.840 | 0.653 | 0.746 |
| 2 | 72 | Y | 9.96 | 0.078 | 0.251 | 2.34 | 0.760 | 0.587 | 0.674 |
| 3 | 72 | Y | 9.50 | 0.084 | 0.272 | 2.28 | 0.800 | 0.620 | 0.710 |
| 4 | 72 | N | 10.85 | 0.057 | 0.249 | 1.88 | 0.618 | 0.466 | 0.542 |
| 5 | 62 | Y | 4.90 | 0.132 | 0.229 | 2.40 | 0.647 | 0.550 | 0.548 |
| 6 | 62 | N | 5.51 | 0.084 | 0.234 | 2.21 | 0.466 | 0.517 | 0.492 |
| 7 | 52 | Y | 2.60 | 0.168 | 0.176 | 3.19 | 0.438 | 0.526 | 0.482 |
| 8 | 52 | N | 2.65 | 0.152 | 0.212 | 2.61 | 0.402 | 0.556 | 0.479 |

$T^B$ = reactor temperature, °C., degrees Centigrade
Q = feedstock flow rate in grams/hour
U = utilization factor
Y = yield in grams/hour
E = enrichment factor
QU = Q multiplied by U, grams/hour
YE = Y multiplied by E, grams/hour All of the standard elements of the reactor system, i.e., the lamp, the filter, and the reactor vessel are formed of a material which is transparent to the desired excitation radiation, particularly 253.7 nm (2537 Å) for $^{196}$Hg. One preferred material is quartz. While the lamp used in the reactor of the present invention may be any low pressure (e.g., about 2.5 Torr) electric discharge type lamp which transmits radiation of about 253.7 nm, those using microwave cavities for the excitation are preferred.

An especially preferred lamp comprises an electroded mercury-inert gas lamp. At least two electrodes are positioned and sealed at each end of a sealed lamp envelope which contains mercury vapor and one or more inert gases. The sealed lamp envelope is surrounded at least in part by an elongated tube which defines a region for controlling a heat exchange medium which controls the temperature of the inner, sealed lamp envelope.

In one embodiment, uniform temperature is created in the Hg lamp by circulating H$_2$O at a predetermined temperature about an isolated section of the lamp. Other fluids, or inert gases such as argon, helium, xenon and neon, can be selected depending on their boiling point behavior to provide the desired uniform temperature of the inner discharge envelope.

The circulating heat transfer medium also prevents the formation of O$_3$ (ozone) by purging O$_2$ in the exposed to 185 nm radiation which may be emitted by the lamp. Ozone, in turn, absorbs various wavelengths of radiation emitted from the lamp. This is undesirable because radiation having a wavelength of 253.7 nm, useful for the photochemical separation of $^{196}$Hg, is absorbed of O$_3$. Thus, in a preferred embodiment, a fluid or inert gas is circulated about the entire exterior of the lamp envelope, thereby purging all of the O$_2$ from the immediate vicinity of the envelope. This allows for a greater emission intensity of the particular, desired radiation from the lamp envelope.

In a preferred embodiment, the outer lamp jacket comprises a quartz cylinder. This outer jacket serves several purposes. First, it allows for the use of a gas purge, if desired, for eliminating $O_2$ about the transmission section, thereby reducing $O_3$ formation. Second, if the outer jacket is designed to be demountable, it permits the interchange of different inner lamp envelopes. This makes possible the isolation of different Hg isotopic distributions using the same outer jacket. Also, lamp envelopes having different diameters can be used to affect the emitted linewidth of radiation.

The fact that the outer tube can be demountable allows for the use of outer tubes of different types of materials which can selectively filter certain emitted wavelengths. For example, by changing the outer tube material to Vycor 7910, it is possible to filter wavelengths below 200 nm thereby eliminating ozone formation in the region surrounding the lamp.

Figure 6:
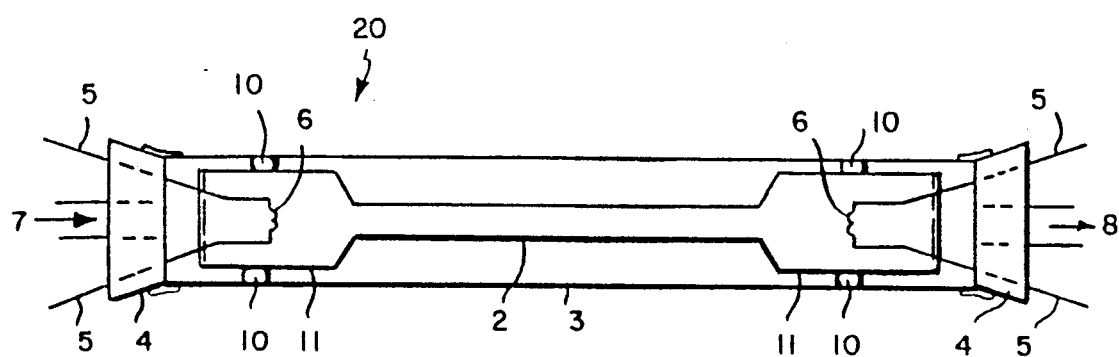
FIG. 6 illustrates the preferred monoisotopic lamp used in the reactor of the present invention.

FIG. 6 illustrates the preferred lamp which is used in the reactor of this invention.

The mercury lamp 20 of FIG. 6 comprises an inner lamp envelope 2 and an outer jacket 3. In the preferred embodiment, both the envelope 2 and the outer jacket are constructed of quartz. The envelope 2 can be of various diameters depending on the desired optical depth. A larger diameter provides greater power density and broader bandwidth. For the isotopic separation of $^{196}Hg$, the inner diameter of the envelope is typically about 10 nm. The envelope 2 typically contains a source of Hg such as elemental Hg as well as an inert gas such as argon. However, any inert gas which is compatible with Hg vapor can be used. Typically, between about 1 and 2 mg of Hg is contained within lamp envelopes which have an inner diameter of about 10 mm. The length of the lamp can be from about 30-150 cm with a preferred length of about 40 cm.

A tapered stopper 4, typically of an elastomeric material, is disposed at each distal end of the outer jacket 3 and serves to substantially center the outer jacket around at least one section of the envelope 2. Furthermore, the tapered stopper guides and positions an electrode lead 5 through both the stopper and the outer jacket, and into the envelope where it provides current for the electrodes 6. In the preferred embodiment, the electrodes are shaped as coils and able to withstand a current of at least about 5 amperes. The tapered stoppers also contain openings in their centers which provide for an inlet 78 and outlet 8 stream of circulating heat transfer medium which is preferably water. The heat transfer medium circulates about at least one portion of the inner discharge envelope 2. The heat transfer medium then exits the lamp at outlet 8 contained in the outer jacket. Tubes, 11, preferably comprising a heat resistant glass are connected to each end of the envelope to provide regions to contain the electrodes and to further provide regions for mounting the envelope within the jacket. These tubes 11 are preferably separated from the outer tube with spacers 10 preferably comprising elastomeric materials. It is pointed out that the spacers 11 must have openings which allow the heat transfer medium to travel through the lamp The temperature of the inner envelope 2 is controlled by the temperature of the circulating heat transfer medium. As the temperature of the heat transfer medium is increased or decreased, the corresponding temperature of the inner envelope also increases or decreases. The linewidth of the emitted radiation is typically affected greatly by temperatures between 15° C. and 50° C. The emission intensity depends strongly on the temperature of the inner envelope.

The entire lamp assembly can be placed within a mercury vapor filter. In one preferred embodiment, the filter comprises a hollow, axial elongated torus containing mercury vapor and an inert gas. This structure can be formed by the combination of two tubes, preferably quartz, where an inner tube is inserted into an outer tube and the tubes are sealed at both ends. This encloses a medium which can be made to contain a gaseous Hg vapor medium which transmits wavelengths of light desirable for the photochemical separation of $^{196}Hg$ or specific isotopes of Hg.

In a preferred embodiment of this invention $^{196}Hg$ is produced by enriching mercury compounds using radiation with a wavelength of 253.7 nm. The control of the specific wavelength is very dependent upon the vapor equilibrium temperature within the lamp envelope, which depends, in turn, upon the lowest temperature within the envelope. The vapor pressure of Hg within the envelope (for useful mercury isotope separation) and the intensity of the emitted radiation are proportional with a variation of about 10-15%.

If the intensity of radiation emitted from the lamp increases, the corresponding linewidth of the emitted radiation also increases. This causes other isotopes of mercury to become excited. Such an effect is undesirable, as it leads to a separation which yields a product having lower isotopic specificity. Thus, it is important to control the vapor pressure of the lamps to ensure that radiation of the proper linewidth is emitted. For a further explanation of the relationship between lamp temperature, radiation intensity and linewidth of the radiation see Maya et al., *Science,* 26: 435-436 (1984), the teachings of which are incorporated herein by reference.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. In a photochemical reactor useful for the isotopic enrichment of a predetermined isotope of mercury, said reactor consisting of a pair of concentric spaced-apart sleeves, said spacing defining an annular gap therebetween, which gap is sealed at each end thereof, said reactor utilizing reactor flow parallel to the central axis of the annular gap;

the improvement comprising: creating axi.symmetrical reactor flow with respect to the central axis of the annular gap, by placing a plurality of entrance and exit ports on the respective annular gap seals of said reactor.

2. The improved reactor cell of claim 1 wherein, sufficient inlet and outlet ports are provided to the system such that pressure within the reactor cell is substantially uniform.

3. In a photochemical reactor useful for the isotopic enrichment of a predetermined isotope of mercury consisting of a reactor cell of radius R and length L, said cell having parallel reactor flow;

the improvement comprising: creating axi-symmetrical reactor flow by inserting into said reactor cell, a plurality of tubular members having length $L_2$ and radius $r_i$ such that $r_i \leqq R$ and $L_2 \leqq L$ and directing gas/vapor phase reagents substantially uniform by through said tubular members so that wherever the flow twists in the reactor, it is the same, regardless of its angular position and was the axis of the reactor.

4. The improved photochemical reactor of claim 3, wherein R is up to about 50 cm and L is up to about 150 cm.

5. The improved photochemical reactor of claim 3, wherein R is from about 5 to about 15 cm and L is about 40 cm.

6. The improved photochemical reactor of claim 3, which further comprises one or more manifolds which distribute the gas/vapor phase reagents in said reactor substantially uniformly to said tubular members.

7. The improved photochemical reactor of claim 6, wherein the manifolds are circular.

8. The improved photochemical reactor of claim 6, wherein the manifolds are semi-circular.

9. The improved photochemical reactor of claim 6, wherein the reactor chamber is removable from the system without disturbing the location of other component parts of the reactor system.

* * * * *